United States Patent [19]

Miwa et al.

[11] Patent Number: 6,034,931
[45] Date of Patent: Mar. 7, 2000

[54] METHOD OF RECORDING MEDIA DATA ON A STORAGE MEDIUM AND METHOD AND SYSTEM FOR ACCESSING THE MEDIA DATA RECORDED ON THE STORAGE MEDIUM

[75] Inventors: Kunihiko Miwa, Hiratsuka; Hiroya Kobayashi, Machida; Norishige Morimoto, Tokyo, all of Japan

[73] Assignee: International Business Machines Corporation, Armonk, N.Y.

[21] Appl. No.: 08/928,853

[22] Filed: Sep. 11, 1997

[30] Foreign Application Priority Data

Oct. 16, 1996 [JP] Japan .................................... 8-273551

[51] Int. Cl.⁷ .................................................. G11B 7/00
[52] U.S. Cl. ................................ 369/47; 369/59; 380/4
[58] Field of Search ................................ 369/84, 58, 48, 369/47, 59, 54, 32; 360/60; 380/4, 5

[56] References Cited

U.S. PATENT DOCUMENTS

| | | | |
|---|---|---|---|
| 5,057,947 | 10/1991 | Shimada ..................................... | 360/60 |
| 5,418,853 | 5/1995 | Kanota et al. ............................... | 380/5 |
| 5,535,275 | 7/1996 | Sugisaki et al. .......................... | 380/10 |
| 5,627,655 | 5/1997 | Okamoto et al. ........................... | 380/3 |
| 5,887,130 | 3/1999 | Doi et al. ................................. | 395/186 |
| 5,889,919 | 3/1999 | Inoue et al. ................................ | 380/5 |

FOREIGN PATENT DOCUMENTS 8-159330  6/1996  Japan .

*Primary Examiner*—Thang V. Tran
*Attorney, Agent, or Firm*—Scully, Scott, Murphy & Presser; Jay P. Sbrollini, Esq.

[57] ABSTRACT

Management information is embedded by directly controlling media with a date hiding technique. A system which accesses (regenerates or records) media data by using the management information is controlled based on this management information, and according to the contents of the management information, the access to media data is inhibited. Therefore, illegal duplication of data can be prevented, and consequently, works can be effectively protected. More particularly, in a system for accessing media data stored on a storage medium 51, the system comprises means 52 for reading out data from the storage medium, means 56 for specifying an embedding region, in which management information for managing access to the media data was embedded, from the read-out data and for extracting the management information in accordance with a status of the embedding region by referring to an extraction rule where the status of the embedding region is caused to correspond to the contents of data to be extracted, means 60 for generating an access interference signal, and means 59 for selectively outputting either the read-out signal or a signal generated by both the read-out signal and the access interference signal, in accordance with the contents of the management information.

15 Claims, 6 Drawing Sheets

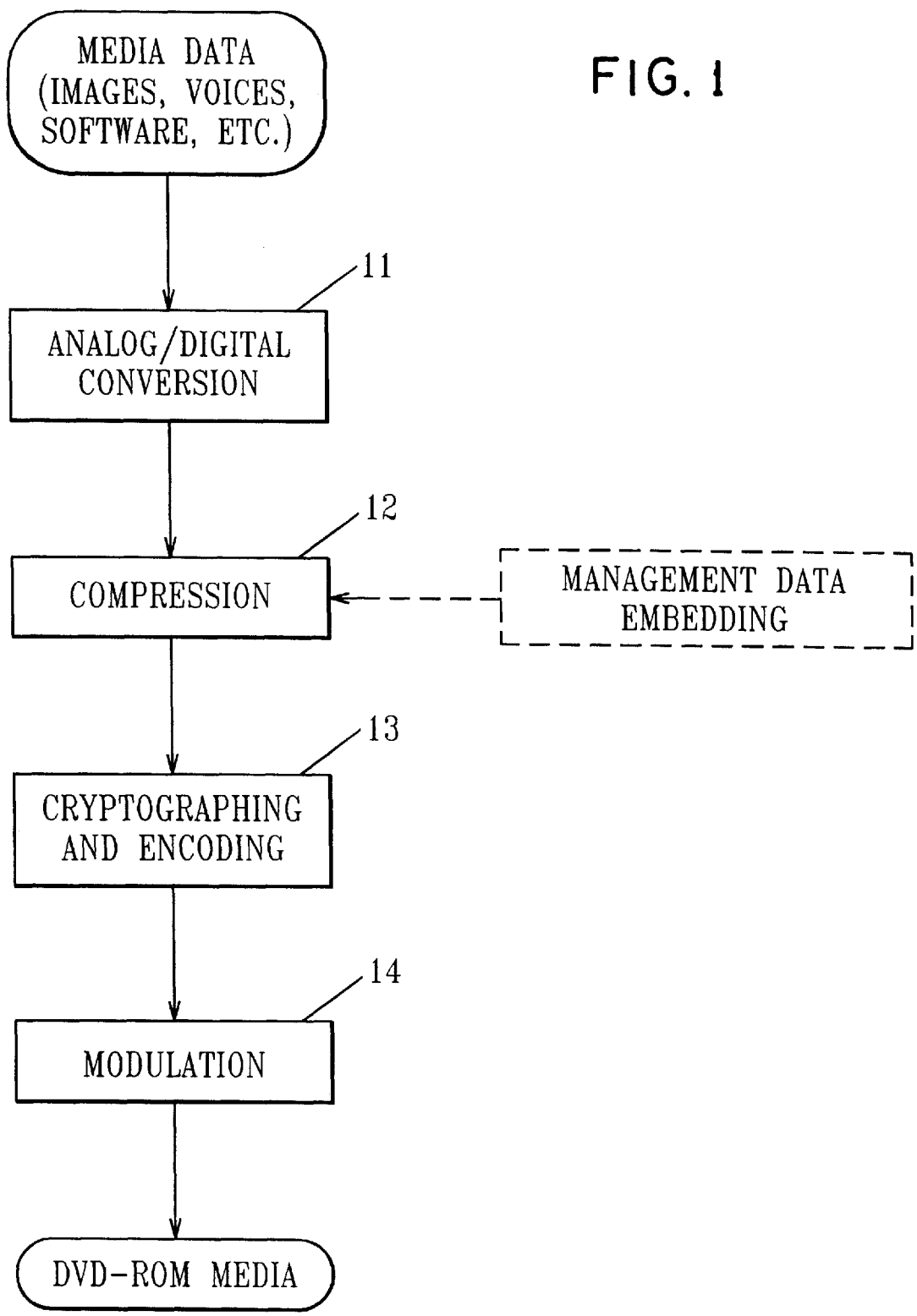

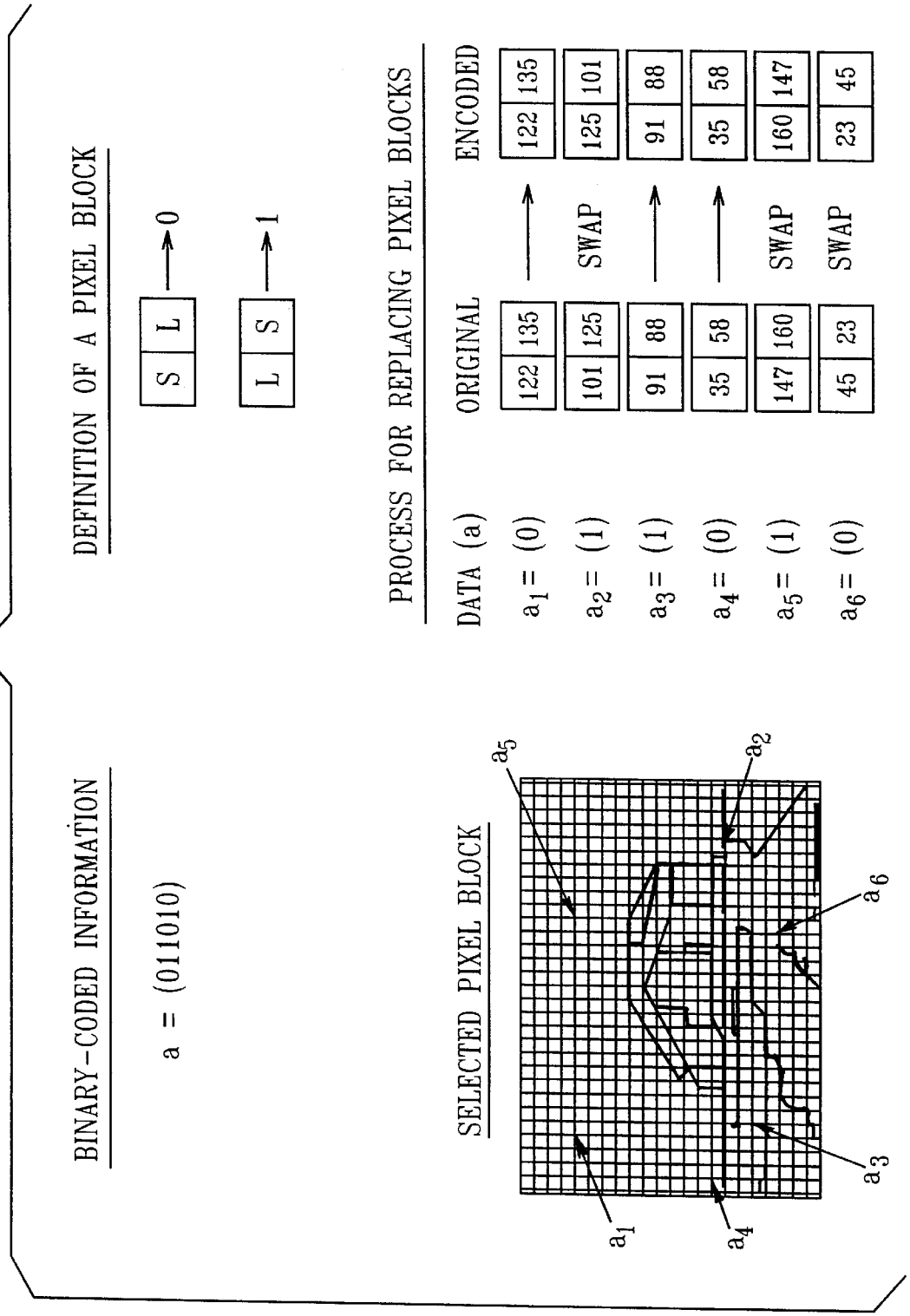

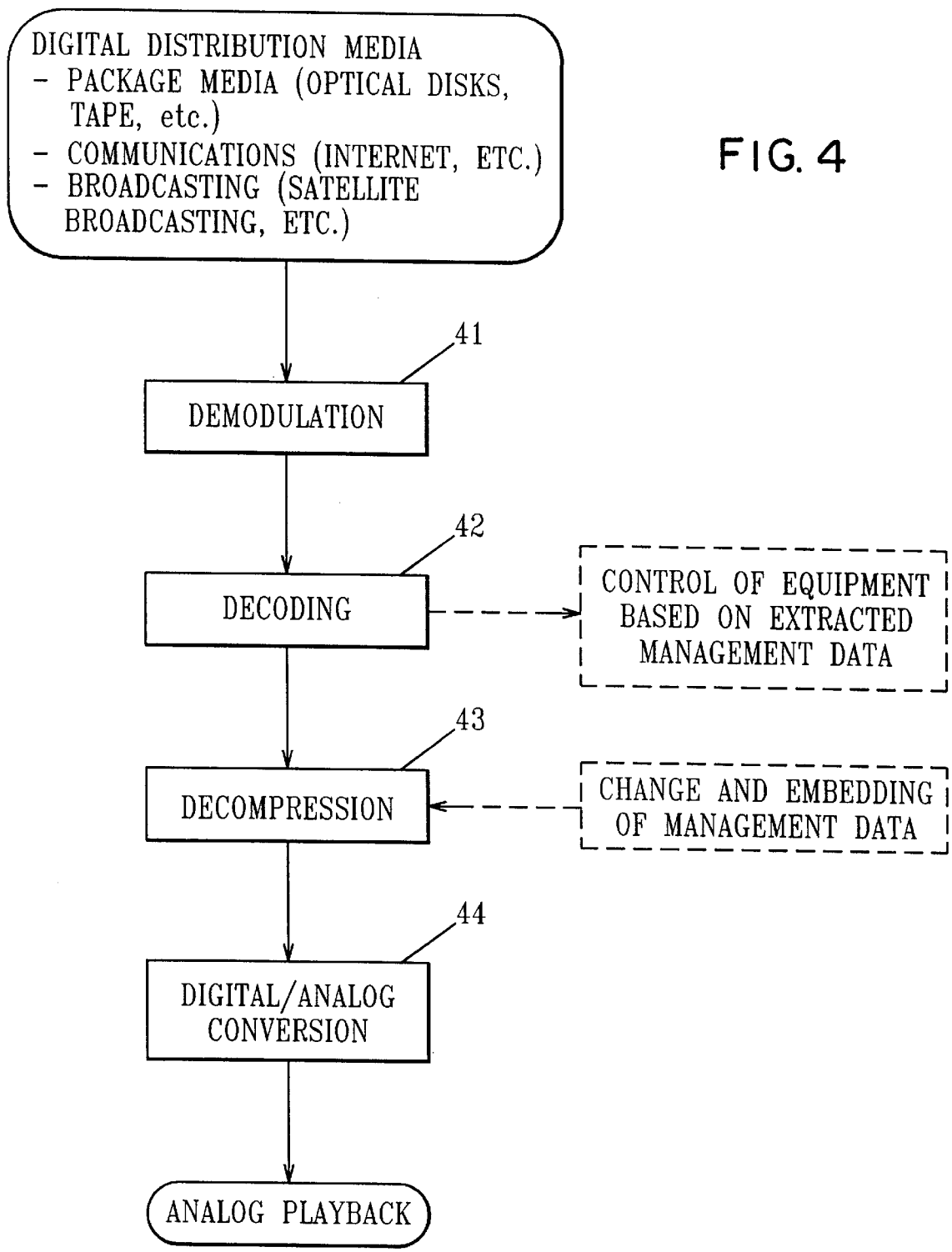

METHOD OF RECORDING MEDIA DATA ON A STORAGE MEDIUM AND METHOD AND SYSTEM FOR ACCESSING THE MEDIA DATA RECORDED ON THE STORAGE MEDIUM

BACKGROUND OF THE INVENTION

1. Technical Field

The present invention relates to a method of recording media data on a storage medium and a method and system for accessing the media data recorded on the storage medium. Particularly, the invention relates to embedding management information into media data and controlling access to the data, based on this management information, when the data is accessed.

2. Prior Art

With the spread of multimedia environments, systems handling digital information, such as digital video disks (DVDs), digital video cameras (DVCs), digital CS satellite broadcasting, and internets, are becoming still more popular. Also, the development of apparatuses which can process and transfer very large quantities of multimedia data at high speed has advanced. However, continued and further increase in popularity of such devices depends upon the number of applications, such as theater movies. No matter how excellent hardware may be, the spread of the hardware would be difficult it there is a small quantity of software which attracts the purchasing desire of customers.

What is problematic at this time is the protection of works or contents stored on various medium. For example, digital video disks have a sufficient hardware based method in the distribution of theater movies. However, for addressing problems with protection of copyright or prevention of illegal copy, there have been no methods provided that are satisfactory to suppliers of works or contents. This is because the contents of digital data can be easily copied and changed. Under such present conditions, it cannot be expected that many attractive contents are distributed with these media. In fact, since such problems with copyright have not been solved, digital video cameras have only been sold as exclusive machines for photographing.

Thus, effectively protecting digitized works is indispensable for a further spread of multimedia, and the development of such protection techniques and the generation of normalized standards have been pursued.

When the duplication conditions of digital contents of digital audio tape (DAT), are controlled, a copy generation management system (CGMS) signal has hitherto been adopted generally. The CGMS signal is constituted by two bits of data and represents the following duplication.

| CGMS Signal | Duplication Condition |
| --- | --- |
| 11 | Duplication inhibition |
| 00 | No limitations on duplication |
| 10 | One-time duplicability |

The aforementioned method writes the two data bits in a predetermined place of data format. When duplication is performed, the aforementioned CGMS signal is detected at a receiver end. If the content of the signal represents duplication inhibition, the receiver stops the duplication of the content. However, this written place can be easily detected and the content can also be easily written over, so it is easy for users to overwrite the content of this signal. That is, it is difficult in the conventional technique to effectively prevent the illegal duplication of contents. Hence, there has been a desire for the development of techniques which can effectively manage access to digital contents and effectively prevent illegal duplication.

SUMMARY OF THE INVENTION

In view of the aforementioned problems, the objective of the present invention is to provide a system which is capable of effectively protecting works by protecting data and inhibiting data change.

In particular, one embodiment of the present invention is directed to a method of recording media data on a storage medium. The method comprises the steps of: specifying in the media data an embedding region in which management information for controlling access to the media data is embedded; referring to an embedding rule where a content of data to be embedded is caused to correspond to a status of the embedding region, controlling the status of the embedding region in accordance with the management information, and thereby embedding the management information into the media data; and recording the media data embedded with the management information on the storage medium.

The management information may be duplication enabling information for managing duplication of the media data. Also, the management information may be playback enabling information for managing playback of the media data.

A second embodiment of the present invention provides a method of accessing media data stored on a storage medium. The method comprises the steps of: reading out data from the storage medium; specifying an embedding region, in which management information for managing access to the media data was embedded, from the read-out data; extracting the management information in accordance with a status of the embedding region by referring to an extraction rule where the status of the embedding region is caused to correspond to the contents of data to be extracted; and generating the media data from the read-out data in accordance with the contents of the management information.

Here, the second embodiment may further have a step of changing the contents of the management information.

In the second embodiment, the management information is duplication enabling information for managing duplication of the media data. When the duplication enabling information enables duplication of the media data, the duplication of the media data may be allowed, and when the duplication enabling information inhibits duplication of the media data, the duplication of the media data may be inhibited. Also, the management information may be duplication enabling information which determines a condition for managing duplication of the media data. When the condition is changed by accessing the media data, it is preferable to change the contents of the management information in the read-out data.

In addition, in the second embodiment, the management information may be playback enabling information for managing playback of the media data. When the playback enabling information enables playback of the media data, the playback of the media data may be allowed, and when the playback enabling information inhibits playback of the media data, the playback of the media data may be inhibited. Also, the management information may be playback enabling information which determines a condition for managing playback of the media data. When the condition is changed by accessing the media data, it is preferable to change the contents of the management information in the read-out data.

A third embodiment of the present invention provides a system for accessing media data stored on a storage medium. The system comprises: a reader for reading out data from the storage medium; an extractor for specifying an embedding region, in which management information for managing access to the media data was embedded, from the read-out data and for extracting the management information in accordance with a status of the embedding region by referring to an extraction rule where the status of the embedding region is caused to correspond to the contents of data to be extracted; a generator for generating an access interference signal; and an output unit for selectively outputting either the read-out signal or a signal generated by both the read-out signal and the access interference signal, in accordance with the contents of the management information.

The third embodiment may further have a changer for changing the contents of the management information.

Here, the management information may be duplication enabling information for managing duplication of the media data. When the duplication enabling information enables duplication of the media data, the output unit may output the read-out signal, and when the duplication enabling information inhibits duplication of the media data, the output unit may output the signal generated by both the read-out signal and the access interference signal in order to inhibit duplication of the media data. Also, the management information may be duplication enabling information which determines a condition for managing duplication of the media data. When the condition is changed by accessing the media data, it is preferable to change the contents of the management information of the read-out data.

In addition, the management information in the third embodiment may be playback enabling information for managing playback of the media data. When the playback enabling information enables playback of the media data, the output unit may output the readout signal, and when the playback enabling information inhibits playback of the media data, the output unit may output the signal generated by both the read-out signal and the access interference signal in order to inhibit playback of the media data. Also, the management information may be playback enabling information which determines a condition for managing playback of the media data. When the condition is changed by accessing the media data, it is preferable to change the contents of the management information of the read-out data.

Management information is hidden as additional information into media data recorded on a storage medium. This management information is related, for example, to the playback or duplication conditions of media data, the playback or duplication history, and specification of access equipment. When a system has access to the data recorded on a storage medium, the system is controlled based on the content of the management information. Therefore, it is possible to inhibit data duplication or playback and limit access equipment.

BRIEF DESCRIPTION OF THE DRAWINGS

Preferred embodiments of the present invention will now be described, by way of example only, with reference to the accompanying drawings, in which:

FIG. 1 is a diagram showing a procedure for recording media data on a storage medium;

FIG. 3 is a diagram for explaining the date hiding based on PBC in the case where 1 pixel comprises a pixel block;

FIG. 4 is a diagram showing a procedure for accessing media data recorded on a storage medium;

DETAILED DESCRIPTION OF THE PREFERRED EMBODIMENTS OF THE INVENTION

Figure 2A:
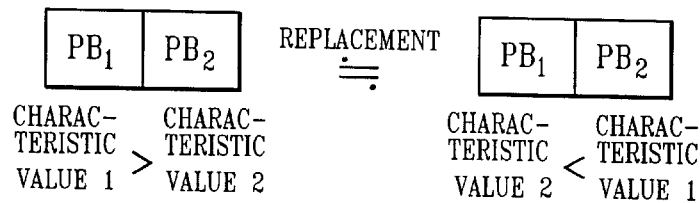
FIG. 2 is a diagram for explaining the hiding and extraction of data employing pixel block coding (PBC)

FIG. 1 is a diagram showing a procedure for recording media data on a storage medium. Media data, such as images, voices, and software, is recorded on DVD-ROM media in accordance with the following procedure.

Media data which is analog data is converted to digital data by performing analog/digital conversion processing (step 11). This converted digital data is compressed, for example, using the moving picture experts group (MPEG) standard (step 12). This compressed data is further coded and cryptographed (step 13). Finally the media data is modulated (step 14) to be recorded on DVD-ROM media.

In this embodiment of the present invention, media data is embedded with management information and then is recorded on a DVD-ROM device. When systems have access to the media data recorded on DVD-ROM, the management information is used to manage the access to the media data, and based on this management information, systems are controlled. In this embodiment, duplication enabling information for managing duplication of media data will be described as an example. With respect to the duplication enabling information, for example, the contents of the data can be caused to correspond to the following status.

Duplication Enabling Information

| Status | Contents of data |
| --- | --- |
| Duplication inhibition | 11 |
| No limitations on duplication | 00 |
| One-time duplicability | 10 |

The embedding of duplication enabling information into media data is performed between analog/digital conversion (step 11) and MPEG compression (step 12). This embedding can be done by using a data hiding technique. A description will hereinafter be made specifically of the data hiding technique.

Here, a description will be made of pixel block coding (hereinafter referred to as PBC) which is both a method of embedding duplication enabling information which becomes an object of hiding into certain media data and, conversely, a method of extracting the embedded data. When PBC is employed, data hiding and data extraction are processed according to a certain conversion rule such as described below.

Generally, in a certain image, the primary characteristics, such as pixel values of two adjacent pixels, have mutually high correlations. Therefore, even if these pixel values were replaced with each other, a degradation of the degree that can be visually recognized would not arise on the image. In view of this nature, the algorithm of the present invention hides 1 bit of data by defining as a pixel block (i.e., a region to be embedded) an image region having at least one pixel and also by intentionally controlling the characteristic of an adjacent pixel block, based on a certain conversion rule. That is, data is expressed by the comparison result of the characteristics of adjacent pixel blocks. Also, when data is extracted, it is extracted according to the extraction rule which is determined based on this conversion rule.

Bit information is expressed by replacing the characteristic values (e.g., brightness values) of two adjacent pixel blocks with each other in accordance with the following conversion rule.

Conversion Rule

Bit 1: Case where the characteristic value of one pixel block ($PB_1$) is greater than that of the other ($PB_2$)

Bit 0: Case where the characteristic value of one pixel block ($PB_1$) is less than that of the other ($PB_2$)

Also, the bit information is extracted by comparing the characteristic values (e.g., brightness values) of two adjacent pixel blocks in accordance with the following extraction rule.

Extraction Rule

Case where the characteristic value of one pixel block ($PB_1$) is greater than that of the other ($PB_2$): bit 1

Case where the characteristic value of one pixel block ($PB_1$) is greater than that of the other ($PB_2$): bit 0

FIG. 2 is a diagram for explaining how the hiding and the extraction of data are performed with the aforementioned PBC. The pixel block $PB_1$ or $PB_2$ may be defined, for example, as a set of a plurality of pixels such as 3×3 pixels, and it is also possible to define a single pixel as a single pixel block. Since adjacent pixel blocks have high correlations, image degradation would not be felt to the extent that it could be visually recognized, even it the positions of adjacent pixel blocks were replaced with each other (FIG. 2(a).

Figure 2B:
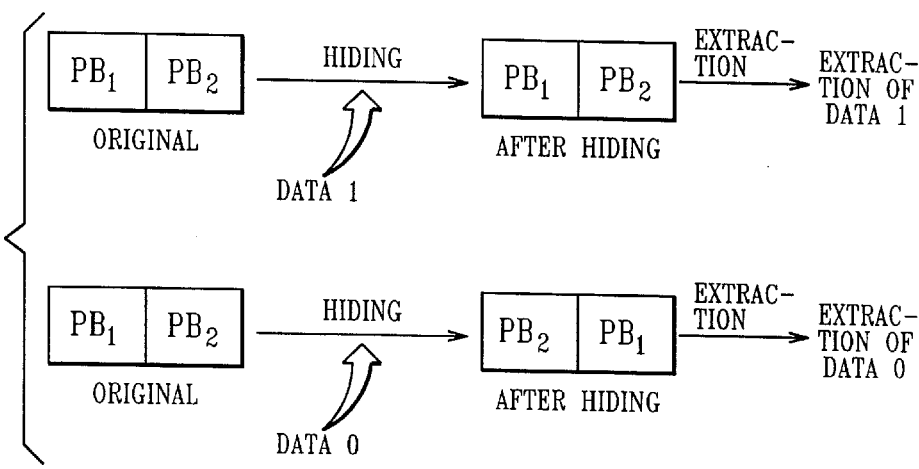

Consider the case where the positions of the pixel blocks in an original image are those shown in FIG. 2(b). First, the characteristic values of two pixel blocks are compared, and as the result, assume that the characteristic value of $PB_1$ is greater than that of $PB_2$. When data 1 is hidden in the original image, the characteristic values of the pixel blocks have already satisfied the condition of the data 1 in the conversion rule, so the characteristic values of these blocks are not replaced with each other. When data is extracted, the extraction rule has defined that the case of the characteristic value of $PB_1$ being greater than that of $PB_2$ is data 1, so data 1 is extracted.

On the other hand, when data 0 is hidden in the original image, the relation between the characteristic values of the pixel blocks in the original image does not satisfy the condition of data 0 in the conversion rule, so the characteristic values of the pixel blocks are replaced with each other. However, this replacement cannot be recognized visually. When data is extracted, data 0 is extracted from the relation of the characteristic values of these blocks in accordance with the extraction rule.

The characteristic value can employ a value related to the primary characteristic and a value related to the secondary characteristic of a pixel block (i.e., a region to be embedded), besides the aforementioned brightness value. The primary characteristic is the direct parameter of a pixel value, such as the brightness or chromaticity of a pixel block. Also, the secondary characteristic is obtained by resolving the primary characteristic, like a value representative of statistical nature such as the average value or dispersion value of the aforementioned parameters. In general, the primary characteristic has a high correlation between two adjacent pixel blocks. On the other hand, the secondary characteristic has a high correlation between spaced two blocks which are not adjacent to each other. Thus, it is noted that pixel blocks which become objects of PBC are not always limited to adjacent blocks. The characteristic value of a pixel block will hereinafter by described with the brightness value which is the primary characteristic, and the dispersion value which is the secondary characteristic, as examples.

First, a description will be made of the case where the characteristic value of a pixel block is taken to be a brightness value. When 1 pixel is caused to correspond to a pixel block, the brightness value of the pixel, as it is, can be used as the characteristic value of this block. Since most natural images have a very high correlation between adjacent pixels, replacing them with each other will not result in a considerable degradation in the image. FIG. 3 is a diagram for explaining the data hiding based on the aforementioned PCB in the case where 1 pixel corresponds to a pixel block.

Next, a description will be made of the case where the characteristic value is taken to be a dispersion value. If the brightness values of pixels are replaced with each other between pixel blocks when the pixel block is constituted by n×m pixels, a considerable degradation will occur on the image. For example, striped patterns will occur on the image. Therefore, it is unpreferable to use the pixel value, as it is, as the characteristic value of a pixel block. Hence, there is considered a method which employs a dispersion value of the brightness of pixels as a characteristic value.

When the nature of the brightness value of a pixel block is resolved into an average value h and a dispersion value d, there could be a little influence on the image even if, between adjacent pixels, the average value h remained the same and only the dispersion value d were replaced. Therefore, it becomes possible to hide data by making use of this nature, taking the characteristic value of a pixel block to be this dispersion value d, and replacing this dispersion value in accordance with the aforementioned conversion rule.

Figure 2C:
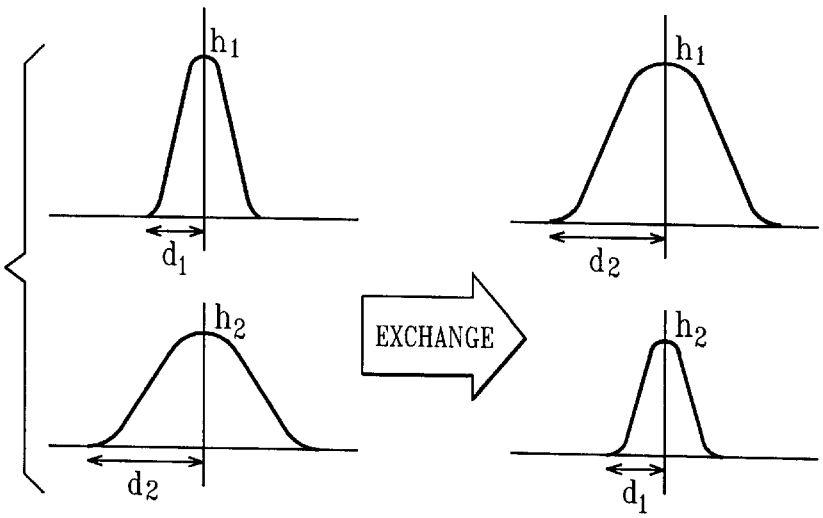

As shown in FIG. 2(c), consider the case where a pixel block $PB_1$ has an average value $h_1$ and a dispersion value $d_1$ and a pixel block $PB_2$ has an average value $h_2$ and a dispersion value $d_2$. When a bit 1 is hidden, $d_1$ is less then $d_2$, so this does not satisfy the condition of bit 1 of the conversion rule. Therefore, only the dispersion values $d_1$ and $d_2$ are replaced with each other between both pixel blocks. This is equivalent to exchanging only the hill-shaped configurations of the characteristic value distributions without changing the average values h between two pixel blocks.

Thus, the embedding of data using the aforementioned data hiding technique, first specifies an embedding region, into which duplication enabling information is embedded, in the aforementioned media data. Then, an embedding rule where the contents of data to be embedded is caused to correspond to the status (characteristic) of an embedding region is made, and the status (characteristic) of the embedding region is directly controlled according to duplication enabling information by referring to the embedding rule. By this direct control, the duplication enabling information can be embedded into the media data. By directly controlling original media data, the embedding of the duplication enabling information united to the original media data is performed. Therefore, since the separation and change of only the duplication enabling information are difficult, the access management of media data can be effectively performed. Note that for the details of PBC, see Japanese Patent Application No. 8-159330.

The media data stored on a DVD-ROM device by the aforementioned method is accessed according to the following procedure.

First, data is read out from the DVD-ROM device. The read-out data is a signal modulated (in step 14) after media data embedded with duplication enabling information is compressed (in step 11) with MPEG and also after media data is coded and cryptographed (in step 12). Therefore, the read-out signal is processed in a procedure which is the reverse of this recording or embedding procedure. FIG. 4 is a diagram showing a procedure for accessing media data stored on a storage medium. First, the read-out data is demodulated (in step 41) and decoded (in step 42), and consequently, digital data compressed with MPEG is obtained. Then, the digital data is decompressed (in step 43) to obtain media data (digital data) embedded with duplication enabling information. Next, the duplication enabling information is extracted from the media data, and consequently the media data and the duplication enabling information are separated. Finally, by converting the media data to an analog signal (in step 44), an analog playback signal is obtained.

To extract duplication enabling information from media data, the aforementioned PBC, which is one of the data hiding methods, is utilized. That is, first, an embedding region, in which the duplication enabling information was embedded, is specified from the read-out data. Next, by referring to the extraction rule where the status of an embedding region is caused to correspond to the contents of data, the duplication enabling information is extracted according to the status of the embedding region.

Now, if the extracted duplication enabling information is data 00, duplication of media data is allowed according to the aforementioned rule. Also, if the extracted duplication enabling information is data 11, it means that duplication of media data is inhibited. In this case an access system is controlled so that duplication of the media data is inhibited.

Furthermore, if the extracted duplication enabling information is data 10, it means that duplication of media data is allowable under a certain condition (e.g., only once). In this case an access system is controlled so the duplication of media data is allowed only once, and furthermore, it is necessary that the media data is prevented from being duplicated based on the duplicated media data. That is, after media data is duplicated once, it is important that the duplication thereafter, based on the duplicated data, is prevented. For this reason, the data content of the duplication enabling information existing in the read-out data is changed from data 10 to data 11 and then it is output as an output signal. Since this output signal contains duplication enabling information which exists in a state of duplication inhibition, data cannot be further duplicated based on the duplicated data.

Figure 5:
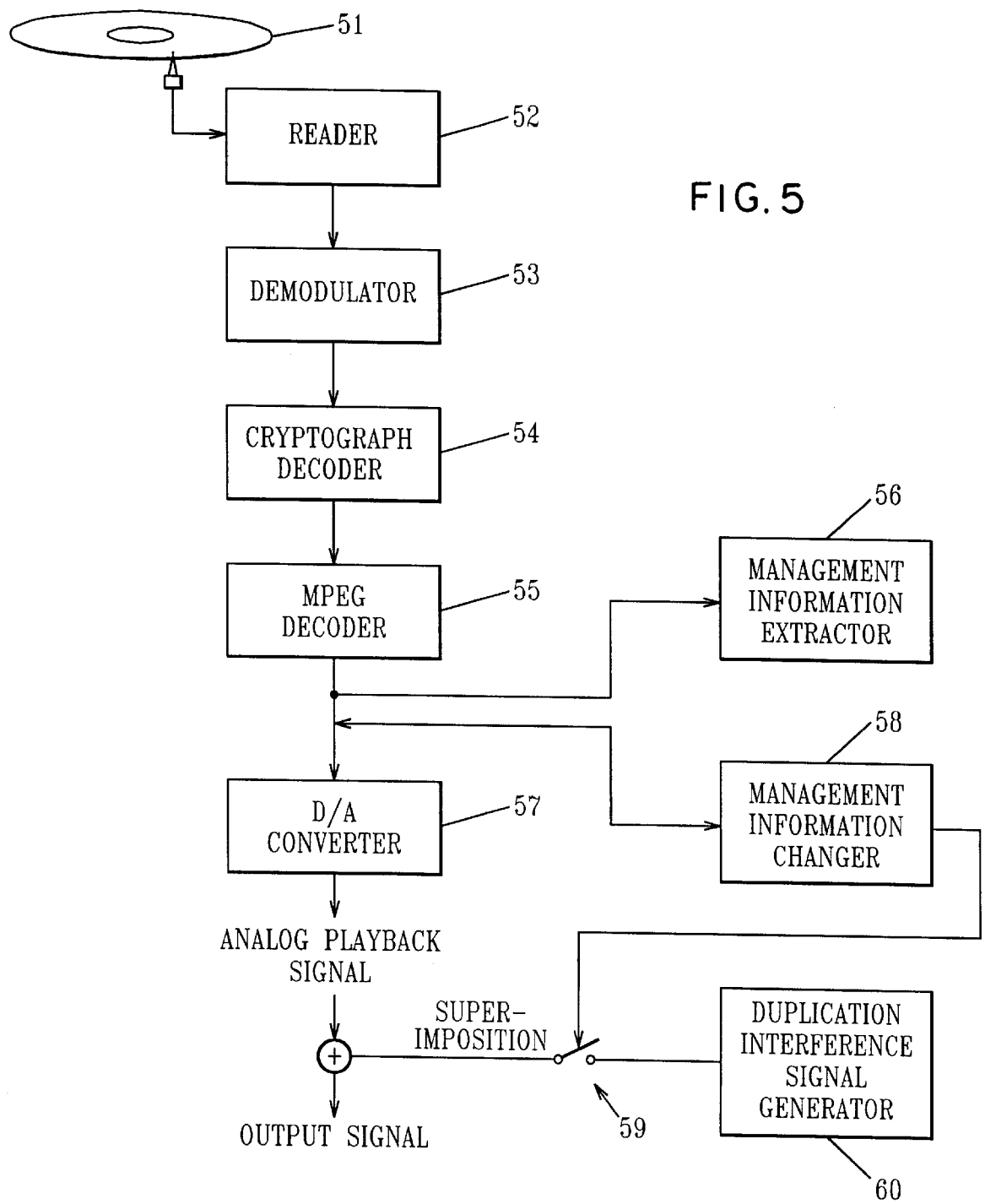
FIG. 5 is a block diagram of an access system for media data.

FIG. 5 is a block diagram of an access system for media data stored on a DVD-ROM device. The DVD-ROM device 51 stores cryptographed and modulated data in which management information was embedded by directly controlling media data with the data hiding technique, as described above. The data, read out of the DVD-ROM device 51 by a readar 52, is processed by a demodulator 53, a cryptograph decoder 54, and an MPEG decoder 55. As a consequence, decompressed digital data is obtained.

A management information extractor 56 specifies an embedding region, in which management information was embedded, from the decompressed digital data which is the output of the MPEG decoder 55, and also extracts the management information in accordance with the status of the embedding region by referring to an extraction rule where the status of an embedding region is caused to correspond to the contents of data to be extracted. A D/A converter 57 converts digitized media data, from which the management information was removed, to an analog signal. Furthermore, a management information changer 58 is used to change the content of management information as needed.

Explaining the aforementioned duplication enabling information as an example, the management information extractor 56 controls a switch 59 so that the switch is turned off, when the duplication enabling information enables duplication of media data. Therefor, an analog signal, which is the output of the D/A converter 57, is output as it is. When, on the other hand, duplication enabling information inhibits duplication of media data, the management information extractor 56 controls the switch 59 so that the switch is turned on. In this case an interference signal generated by a duplication interference signal generator 60 is superimposed on the analog signal which was output from the D/A converter 57, so users cannot acquire desired data. Thus, duplication of media data con be effectively prevented.

Note that when duplication enabling information is "onetime duplicability," the management information changer 58 changes the management information of read-out data to "duplication inhibition." Thus, the data duplication thereafter, based on duplicated data, can be effectively prevented.

While it has been described in the aforementioned embodiment that duplication enabling information is used as management information, the present invention is not limited to the duplication enabling information. It is a matter of course that the present invention is also applicable to various management information such as controlling system. For example, management information may also be the following playback enabling information:

| Status | Contents of data |
| --- | --- |
| Playback inhibition | 11 |
| No limitations on playback | 00 |
| One-time regenerability | 10 |

When playback enabling information enables playback of media data, a system is controlled so that playback of media data is allowed. Also, when playback enabling information inhibits playback of media data, a system is controlled so that playback of media data is inhibited. Furthermore, when playback is possible only once, playback of media data is allowed and also an embedded playback enabling information is changed from data 10 to data 11 by using the aforementioned data hiding technique.

Besides the aforementioned information, the management information ma y be a serviceable term which determines a period of time for which media data can be regenerated or recorded, authentication information for medium content playback, a disk key, or a title key. Any of these pieces of information is data which becomes necessary when media data is accessed.

Data Embedding

While the aforementioned embodiment has been described with the PBC as an example, another data hiding technique will be described. It is noted that this embodiment is different from the aforementioned embodiment in that the embedding of management is performed at the time of MPEG encoding and that the extraction is performed at the time of MPEG decoding.

Figure 6:
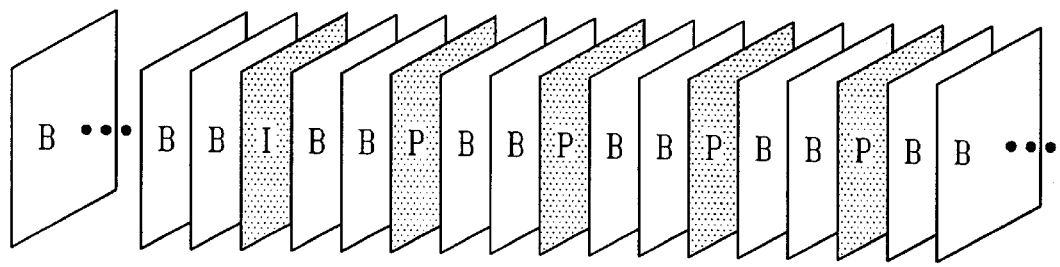
FIG. 6 is a diagram for explaining the array state of pictures in MPEG.

In MPEG, forward prediction from a past playback image, rearward prediction from a future playback image, and bidirectional prediction using both forward prediction and rearward prediction are employed. FIG. 6 is a diagram for explaining the array state of pictures in MPEG. As shown in the figure, in order to realize bidirectional prediction, MPEG prescribes three kinds of picture frames: an I picture, a P picture, and a B picture.

Here, the I picture is an image processed with intraframe encoding (intra-encoding), and all macro blocks on this picture are processed by intra-encoding (intraframe prediction encoding).

The P picture is an image processed by forward interframe prediction encoding, and in some cases, some of macro blocks on this picture are processed with intra-encoding. Furthermore, the B picture is an image processed by bidirectional interframe prediction encoding. The macro blocks on the B picture are basically coded by forward prediction, rearward prediction, or bidirectional prediction, but in some cases, intra-encoding is also included. The picture screen which is coded over the entire surface by intra-encoding is an I picture, and the I and P pictures are coded in the same order as an original moving picture image. On the other hand, for the B picture, the I and P pictures are processed and then a B picture which is inserted between the processed pictures is coded.

Figure 7:
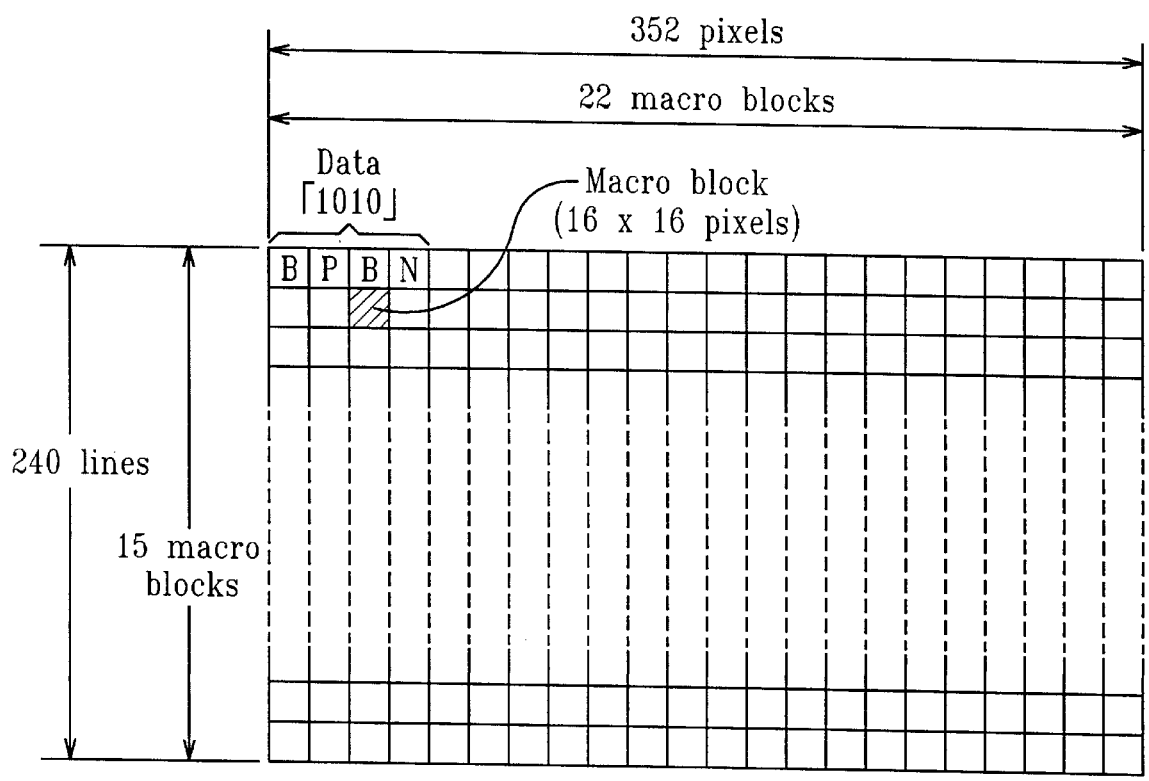
FIG. 7 is a diagram showing the state of macro blocks disposed on a B picture.

The embedding region in which management information is embedded is the macro block on the B picture, and 1 bit of information can be embedded into 1 macro block. Therefore, when message data are multiple bits, there is the need to perform the embedding process with respect to the macro blocks corresponding in number to the multiple bits. FIG. 7 is a diagram showing the state of macro blocks disposed on a B picture. The macro block is the unit that is coded. For each macro block, movement compensation relative to a brightness block with 16 pixels×16 pixels is preformed, and information compression based on a time screen correlation is performed as an interframe prediction method using movement compensation relative to a macro block unit.

The macro blocks on the B picture can be classified into the following four groups as prediction types.
Intra Macro block (intraframe prediction macro block).

The intra macro block is a macro block that is coded by only the information about the screen itself without performing interframe prediction.
Forward Prediction Macro Block The forward prediction macro block is a macro block that is coded with forward prediction by referring to the past I or P picture (reference frame). Specifically, a square region with 16 pixels×16 pixels, which is most similar among the past reference frames, is retrieved, and this macro block has information about a prediction error ($\Delta P$) which is the difference relative to the retrieved square frame and also has information about a spatial relative position (a moving vector). Here, the prediction error $\Delta P$ is expressed as a difference between the brightness and the color difference obtained for 16 pixels×16 pixels. Note that a criterion for selecting a similar square region depends upon encoders.
Rearward Prediction Macro Block The rearward prediction macro block is a macro block that is coded with rearward prediction by referring to future reference frames in order of display. A region, which is most similar among future reference frames, is retrieved, and this macro block has information about a prediction error ($\Delta N$) which is the difference relative to the retrieved region and also has information about a spatial relative position (a moving vector).
Bidirectional Prediction Macro Block The bidirectional prediction macro block is a macro block that is coded with bidirectional prediction by referring to past and future reference frames. A region which is most similar among past reference frames and a region which is most similar among future reference frames are retrieved, and this macro block has information about a prediction error ($\Delta N+\Delta P$)/2) which is the difference relative to the average (per pixel) of these two regions and also has information about a spatial relative position (two moving vectors) between them.

To embed message data, at least one macro block, which is given an embedding process, must first be specified in a B picture. This may be defined, for example, as the respective macro blocks (embedding regions) which exist between the first line and the third line of the B picture, or it may be defined as the entire macro block of a certain frame. In addition to the macro block being previously defined as format in this way, it can also be determined by employing algorithm which generates a position sequence. Note that the algorithm for generating a position sequence can employ the algorithm disclosed, for example, in Japanese Patent Application No. 8-159330.

Next, for the specified macro blocks that are embedded, 1 bit of data is embedded into 1 macro block, based on an embedding rule. This embedding rule is one where bit information is caused to correspond to the prediction type of a macro block. For example, there is the following rule.
Embedding Rule

| Bit information to be embedded | Interframe prediction type of a macro block |
| --- | --- |
| Bit "1" | Bidirectional prediction macro block (represented by B) |
| Bit "0" | Forward prediction macro block (represented by P) or rearward prediction macro block (represented by N) |

For example, consider the case where management information bits 1010 are embedded. The four bits of data are embedded in four embedding regions disposed from the left first macro block of the first line shown in FIG. 7 up to the fourth macro block. First, the first data bit is a 1, so the prediction type of the leftmost macro block (the first embedding region) is determined to be bidirectional prediction (B) in accordance with the aforementioned embedding rule. The prediction error in this case becomes a prediction error which is the difference relative to the average of a region which is most similar among past reference frames and a region which is most similar among future reference frames. The next data bit is a 0. Therefore, the prediction type of the second macro block (the second embedding region) is either forward prediction macro block (P) or rearward prediction macro block (N) in accordance with the embedding rule. In this case, in order to suppress image degradation, the prediction error in the forward prediction and the prediction error in the rearward prediction are compared to select the type whose prediction error is smaller. In the example of FIG. 7, since the prediction error in the forward prediction is smaller than that in the rearward prediction, the forward prediction (P) is selected for the second macro block.

Similar procedure is repeatedly applied to the third embedding region and the fourth embedding region. As a consequence, the prediction type of the third macro block becomes bidirectional prediction (B), and the prediction type of the fourth macro block is determined to be rearward prediction (N) because the prediction error in the rearward prediction is smaller.

In the aforementioned way, the interframe prediction types of the first to the fourth embedding regions are taken to be BPBN and four data bits 1010 (i.e., the management information 1010) are embedded in these regions.

Data Extraction

A description will be made of a method of extracting the management information which was embedded in the aforementioned procedure. In the case where management information is extracted, information for specifying a macro block in which the management information has been embedded must first be given. The specifying information may be given by an outside unit. Also, it is possible to previously embed the specifying information in data itself. In addition, in the case where the position of an embedding region is standardized or if an algorithm for generating a position sequence is known, message data can be extracted. For a message data extracting method using a position sequence, the technique disclosed in the aforementioned Japanese Patent Application No. 8-159330, for example, can be employed.

Next, from the prediction type of the specified embedding region, the information embedded in that region is extracted by referring to an extraction rule. This extraction rule is a rule where the prediction type of a macro block is caused to correspond to bit information, and this extraction rule has to be given as information when extraction is performed. As this rule, there is the following rule. It is noted that the corresponding relation between prediction type and bit information in this extraction rule is the same as that of the aforementioned embedding rule.

Extraction Rule

| Interframe prediction type of a macro block | Bit information to be extracted |
| --- | --- |
| Bidirectional prediction macro block (represented by B) | Bit "1" |
| Forward prediction macro block (represented by P) or rearward prediction macro block | Bit "0" |

A description will be made of the case where management information has been embedded as shown in FIG. 7. As previously described, management information bits have been embedded as a premise in the embedding regions from the left first macro block of the first line shown in FIG. 7 up to the fourth macro block. Because the prediction type of the leftmost macro block is bidirectional prediction (B), bit 1 is extracted by referring to the aforementioned extraction rule. The prediction type of the second macro block is forward prediction (P), so bit 0 is extracted according to the extraction rule. By repeatedly applying the same procedure to the other macro blocks, bit 1 and bit 0 are extracted in sequence. As a consequence, management information bits 1010 are extracted from these regions.

According to this embodiment, the prediction type of a macro block and an embedded bit are determined so that they are caused to correspond with each other, when a moving picture image is coded. Therefore, management information can be embedded in the moving picture image without substantially having an influence on the compression efficiency of the moving picture image and also without substantially causing a degradation in the picture quality. In addition, it is very difficult to remove the management information embedded in this way from the moving picture image. Furthermore, since an amount of information to be embedded is almost independent of the contents of an image, it is possible to efficiently embed message data. Note that this embodiment is disclosed in detail in Japanese Patent Application No. 8-272721.

As will be seen from the foregoing description, the feature of the present invention resides in that management information is embedded in media data with a data hiding method and, when the media data is accessed (regenerated or recorded), a system for managing access to the media data is controlled based on the management information. Therefore, the present invention is not limited to the aforementioned data hiding method and it is noted that the present invention is applicable to a variety of methods.

Thus, in the present invention the management information for managing a system is embedded by directly controlling the media data with a data hiding technique. Therefore, the protection and change of data can be effectively prevented, and consequently, work can be effectively protected.

While the invention has been particularly shown and described with respect to preferred embodiments thereof, it will be understood by those skilled in the art that the foregoing and the changes in form and details may be made therein without departing from the spirit and scope of the invention.

Having thus described our invention, what we claim as new, and desire to secure by Letters Patent is:

1. A method of recording media data on a storage medium, comprising the steps of:

specifying in said media data an embedding region in which management information for controlling access to said media data is embedded;

referring to an embedding rule where a content of data to be embedded is caused to correspond to a status of said embedding region, controlling the status of said embedding region in accordance with said management information, and thereby embedding said management information into said media data; and recording said media data embedded with said management information on said medium.

2. The method as set forth in claim 1, wherein said management information is duplication enabling information for managing duplication of said media data.

3. The method as set forth in claim 1, wherein said management information is playback enabling information for managing playback of said media data.

4. The method of accessing media data stored on a storage medium, comprising the steps of:

reading out data from said storage medium;

specifying from the read-out data an embedding region, in which management information for managing access to said media data was embedded;

extracting said management information in accordance with a status of said embedding region by referring to an extraction rule where the status of said embedding region is caused to correspond to the contents of data to be extracted; and generating said media data from said read-out data in accordance with the contents of said management information.

5. The method as set forth in claim 4, further comprising a step of changing the contents of said management information.

6. The method as set forth in claim 4, wherein said management information is duplication enabling information for managing duplication of said media data and wherein, when said duplication enabling information enables duplication of said media data, the duplication of said media data is allowed, and when said duplication enabling information inhibits duplication of said media data, the duplication of said media data is inhibited.

7. The method as set forth in claim 5, wherein said management information is duplication enabling information which determines a condition for managing duplication of said media data and wherein, when said condition is changed by accessing said media data, the contents of said management information in said read-out data is changed.

8. The method as set forth in claim 4, wherein said management information is playback enabling information for managing playback of said media data and wherein, when said playback enabling information enables playback of said media data, the playback of said media data is allowed, and when said playback enabling information inhibits playback of said media data, the playback of said media data is inhibited.

9. The method as set forth in claim 5, wherein said management information is playback enabling information which determines a condition for managing playback of said media data and wherein, when said condition is changed by accessing said media data, the contents of said management information in said read-out data is changed.

10. A system for accessing media data stored on a storage medium, comprising:

a reader for reading out data from said storage medium;

an extractor for specifying an embedding region from the read-out data, said embedding region containing management information for managing access to said media data, and for extracting said management information in accordance with a status of said embedding region by referring to an extraction rule where a status of said embedding region is caused to correspond to said management information;

a generator for generating an access interference signal; and an output unit for selectively outputting either said read-out signal or a signal generated by both said read-out signal and said access interference signal, in accordance with said management information.

11. The system as set forth in claim 10, further comprising a changer for changing said management information.

12. The system as set forth in claim 10, wherein said management information is duplication enabling information for managing duplication of said media data and wherein, when said duplication enabling information enables duplication of said media data, said output unit outputs said read-out signal, and when said duplication enabling information inhibits duplication of said media data, said output unit outputs said signal generated by both said read-out signal and said access interference signal.

13. The system as set forth in claim 11, wherein said management information is duplication enabling information which determines a condition for managing duplication of said media data and wherein, when said condition is changed by accessing said media data, said changer changes the contents of said management information of said read-out data.

14. The system as set forth in claim 10, wherein said management information is playback enabling information for managing playback of said media data and wherein, when said playback enabling information enables playback of said media data, said output unit outputs said read-out signal, and when said playback enabling information inhibits playback of said media data, said output unit outputs said signal generated by both said read-out signal and said access interference signal.

15. The system as set forth in claim 11, wherein said management information is playback enabling information which determines a condition for managing playback of said media data and wherein, when said condition is changed by accessing said media data, said changer changes the contents of said management information of said read-out data.

* * * * *